United States Patent [19]
Wupper et al.

[11] Patent Number: 5,944,498
[45] Date of Patent: Aug. 31, 1999

[54] PUMP

[75] Inventors: Hans Wupper, Friedrichsdorf/Ts; Dalibor Zaviska, Eschborn/Ts, both of Germany

[73] Assignee: ITT Automotive Europe GmbH, Germany

[21] Appl. No.: 08/514,000
[22] PCT Filed: Feb. 8, 1994
[86] PCT No.: PCT/EP94/00356
  § 371 Date: Aug. 25, 1995
  § 102(e) Date: Aug. 25, 1995
[87] PCT Pub. No.: WO94/19607
  PCT Pub. Date: Sep. 1, 1994

[30]   Foreign Application Priority Data

Feb. 27, 1993 [DE] Germany ............................ 43 06 221

[51] Int. Cl.⁶ .................................................. F04B 39/00
[52] U.S. Cl. ........................ 417/454; 417/569; 417/63; 137/512; 29/890.13
[58] Field of Search ................................ 417/63, 454, 549, 417/554; 137/512; 29/890.13

[56]       References Cited

U.S. PATENT DOCUMENTS 3,055,086  9/1962  Hoganson ........................ 29/890.13
5,112,196  5/1992  Schuh ................................... 417/63
5,626,326  5/1997  Goossens et al. ................. 29/890.13

FOREIGN PATENT DOCUMENTS 834172   3/1952  Germany .
1653459  2/1972  Germany .
3742824  12/1987 Germany .
3907969  3/1989  Germany .

Primary Examiner—Charles G. Freay
Assistant Examiner—Cheryl J. Tyler
Attorney, Agent, or Firm—Rader, Fishman & Grauer PLLC

[57]          ABSTRACT

A pump having a simple and compact construction which permits leakage test of the pressure valve both outside and inside the pump housing, and, if necessary, ensures ease of replacement of individual parts, such as replacement of the pressure valve or the valve seat member, if leakage occurs during testing. The peripheral surface of the valve seat member facing the cover has a conical chamfer onto which an annular projection of the cover is movable into sealing abutment and is radially expandable to provide a press fit engagement.

6 Claims, 2 Drawing Sheets

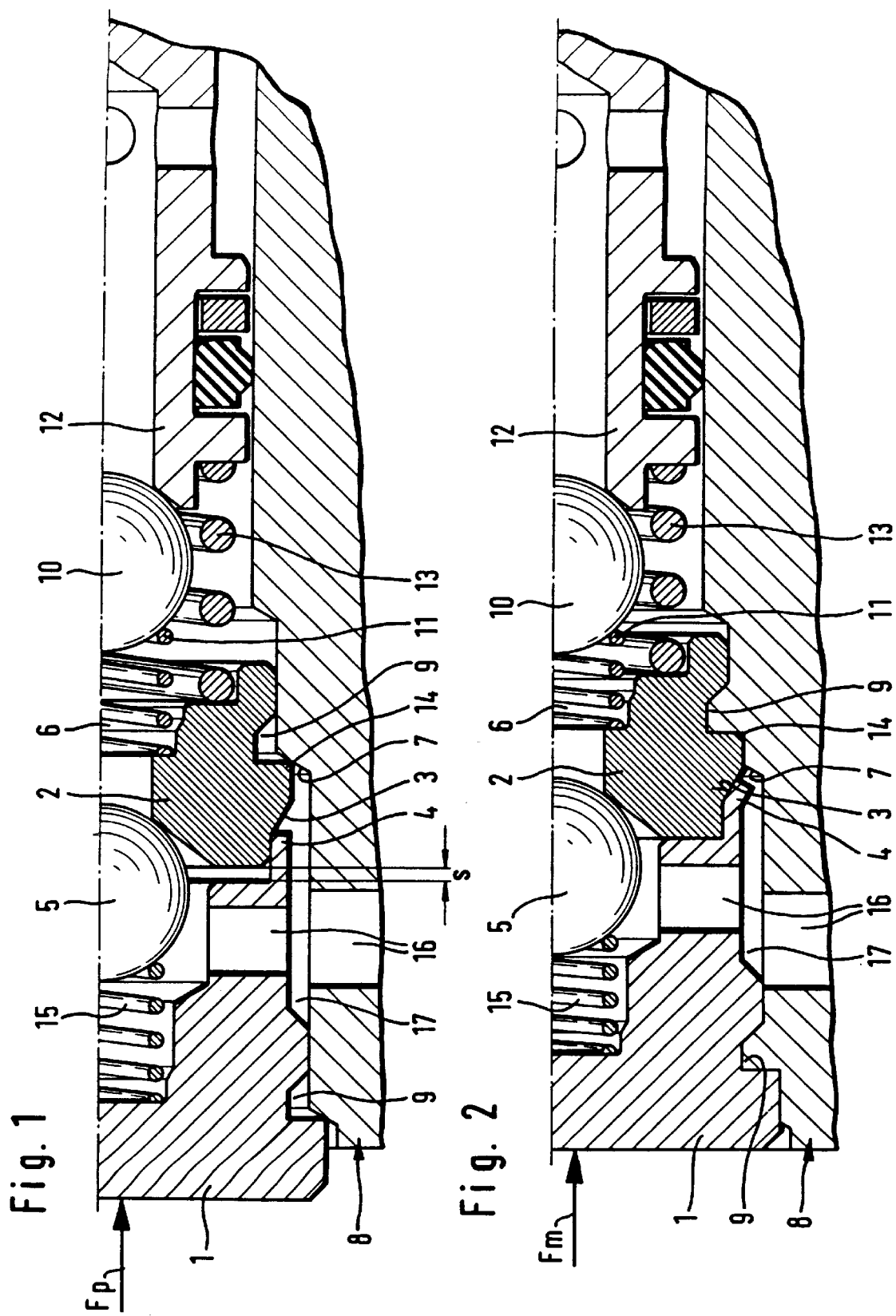

PUMP

TECHNICAL FIELD

The present invention relates to a pump, in particular a pump for the pressure fluid supply in hydraulic brake systems with slip control.

BACKGROUND OF THE INVENTION

DE 37 42 824 A1 discloses a pump having a pump piston which is guided in a bushing within the pump housing. Remote from the pump piston and the compression chamber, the bushing accommodates the valve seat for the pressure valve. The suction valve is arranged within the compression chamber at the pump piston and is connected to a pressure fluid source through a piston-side supply channel. The pressure valve is arranged in a retaining member which is secured to the bushing by way of indentations. The bushing also includes the valve seat for accommodating the pressure valve. It is disadvantageous that the retaining member along with the bushing, as a preassembled unit, can be checked and configured only outside the pump housing which, among others, impairs the interchangeability of the individual parts.

Therefore, an object of the present invention is to improve a pump of the previously mentioned type so that a construction as simple and compact as possible is achieved. Another object of the present invention is to have a pump construction such that leakage test of the pressure valve is permitted both outside and inside the pump housing, and, if replacement is necessary, ease of such replacement of individual parts, such as replacement of the pressure valve or the valve seat member, is ensured if leakage occurs during testing.

This object is achieved according to the present invention in that the peripheral surface of the valve seat member facing the cover has a conical chamfer onto which an annular projection of the cover is movable into sealing abutment and is radially expandable to provide a press fit engagement.

BRIEF DESCRIPTION OF THE DRAWINGS

FIG. 1 is a longitudinal semi-section of a pump shown in a partial view to explain the assembly of the valve and the cover during the function and leakage test.

FIG. 2 is the end position of the assembly elements shown in FIG. 1 after completion.

DETAILED DESCRIPTION OF THE PREFERRED EMBODIMENTS

Figure 3:
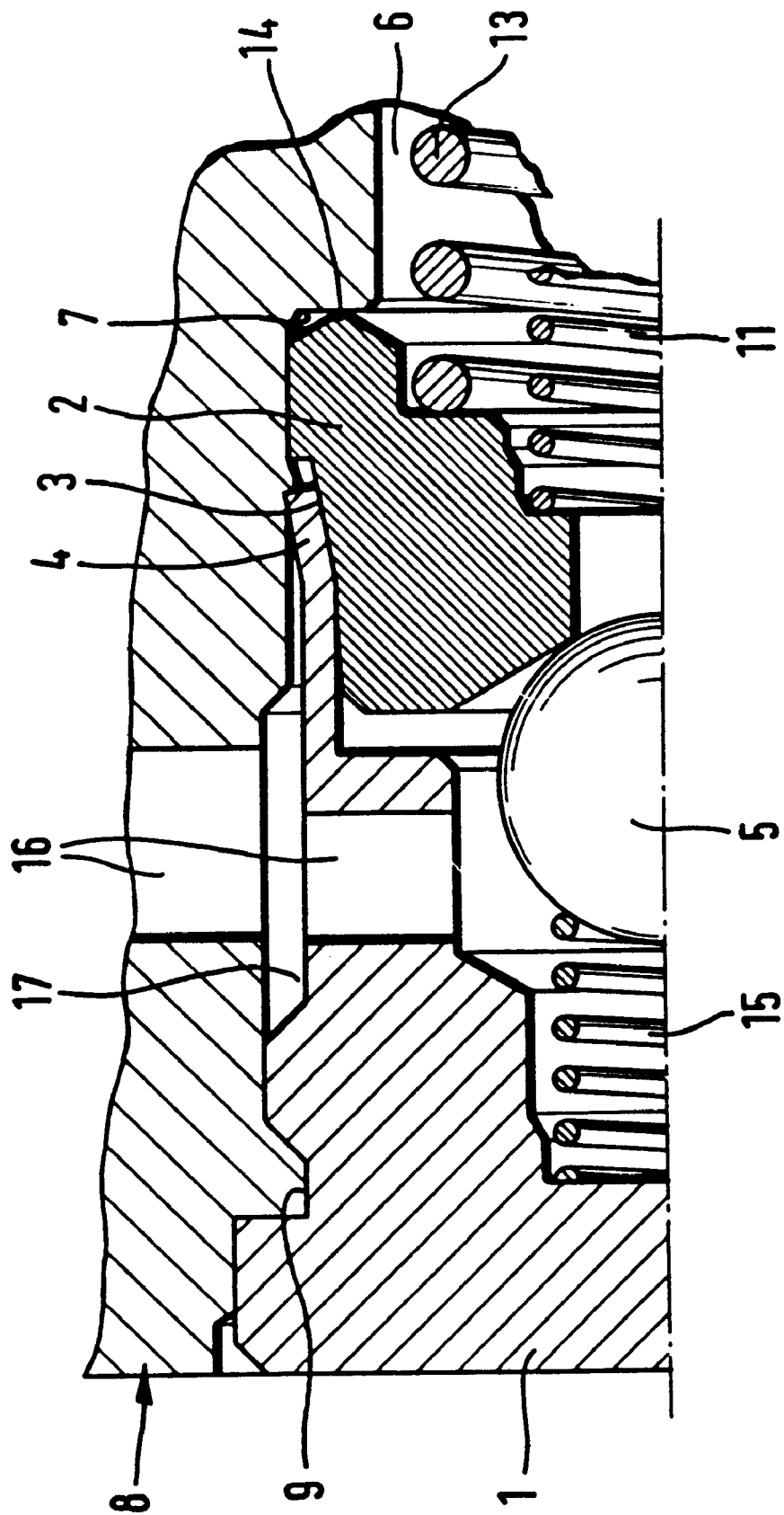
FIG. 3 is a second embodiment of the cover and the valve seat shown in FIGS. 1 and 2.

FIG. 1 shows a coaxial series connection of suction valve 10 and pressure valve 5 within the pump cylinder and, thus, within pump housing 8. Suction valve 10 is urged in the direction of the valve seat arranged on pump piston 12 under the action of a pressure spring 11. Another pressure spring 13 within the compression chamber 6, which is arranged in parallel to the first compression spring, contacts the end surface of pump piston 12 for resetting of the piston. Both pressure springs 11, 13, with their opposed coil ends, are supported on a valve seat member 2 which, under the action of pressure force of a cover 1 provided as a pressure valve supporting member, is pressed with its sealing edge 14 against bore step 7 of the pump cylinder. The pressure force Fp introduced for the leakage test of the pressure valve 5 is transmitted to a conical chamfer 3 of valve seat member 2 by way of a projection 4 which annularly extends along the periphery of the cover 1. In the assembly position of cover 1 in relation of the valve seat member 2, as shown in the drawing, the pressure valve 5 acted upon by a pressure spring 15 isolates already the compression chamber 6 from port 16 of the pressure fluid consumer. In this arrangement, initially, an axial clearance "s" remains between the end surfaces of the cover 1 and the valve seat member 2 in order to be able to attach the cover 1 in the pump housing 8 in the further course of the assembly. In the illustrated position of the cover, first, an undercut 9 acts as an annularly extending sealing edge 14 at the outside area of the cover 1 to prevent leakage to the atmosphere during the introduction of the test pressure through port 16.

FIG. 2 shows the cover 1 and the valve seat member 2 in their end position after the assembly force Fm has been applied. The magnitude of the assembly force Fm is in excess of the test force Fp by the amount of the pump housing material to be displaced for the deformation of the projection 4 into the undercut 9 of the cover 1 and the valve seat member 2. The original axial clearance "s" provided between the cover 1 and the valve seat member 2, as a result, is removed due to expansion of the annular projection 4. All other component parts, which are not explained in detail in FIG. 2, are identical with those in FIG. 1 having identical reference numerals.

In contrast to FIG. 2, FIG. 3 shows a second embodiment of the present invention. The projection 4 of cover 1 is extended in order to enter as a wedge into the cylinder wall of the pump housing 8 beyond the conical chamfer 3 of the valve seat member 2. This wedge-shaped shearing engagement prevents by all means leakage of pressure fluid from the compression chamber 6 through the sealing edge 14 of the valve seat member 2 to the port 16 of the pressure fluid consumer. Under the action of the test force or assembly force Fp, Fm, respectively the sealing edge 14 of the valve seat member 2, in the shape of a frontally circumferential blade, moves into abutment on the bore step 7, thereby providing a metallic sealing. The hydraulic connection of the compression chamber 6 to the port 16 is thus possible exclusively by way of the pressure valve 5. The port 16 to the pressure fluid consumer extends as a radial opening through the projection 4 in the cover 1, as shown in the drawing. Alternatively, the radial opening can be arranged in the valve seat member 2 to establish a hydraulic connection between the port 16 controlled by the pressure valve 5 and the annular chamber 17 positioned between the cover 1 and the pump housing 8.

A pump design is provided by the present invention permitting the number of component parts to be reduced, providing a simplified and reliable sealing and ensuring a simple, safe and fluid-tight attachment of the valve seat member and the cover.

The high-pressure test of the pump is easily possible by pressing the cartridge unit (cover, pressure valve and valve seat member) against the sealing edges prior to the final assembly. Either the cartridge unit or elements of the cartridge unit can be replaced in case of defective parts. For testing the pressure valve 5, the sealing edges 14 of the cover 1 and the valve seat member 2 are pressed against the pump housing 8 by a sufficient contact pressure, and the axial distance of the sealing edges is conformed to the housing. This is permitted by the clearance "s" in the press fit engagement. The contact pressure of the valve seat member 2 corresponds to the frictional resistance and deformation resistance in the joint between the valve seat member 2 and the cover 1. During chalking of the cartridge unit, the assembly force Fm is increased, and the housing material is deformed to move into the grooves in the cover and the valve seat member.

We claim:

1. A pump, comprising:

a pump housing including walls defining a pump cylinder, a pump piston guided in said pump cylinder, a suction valve disposed in a compression chamber arranged in a supply line of the pump cylinder, a pressure valve arranged at an outlet of the compression chamber, said outlet having a pressure fluid connection to a pressure fluid consumer, a cover closing the pump cylinder, wherein the pressure valve is interposed between said cover and a valve seat member in the pump housing, wherein the valve seat member includes a conical chamfer into which an annular projection of the cover is moved into sealing abutment therewith and is radially expandable to provide a press fit engagement therewith.

2. Pump as claimed in claim 1, wherein the compression chamber has an expanded bore step that axially abuts and seals an end area of the valve seat member that is remote from the pressure valve.

3. Pump as claimed in claim 1, wherein the valve seat member is provided as a substantially disc-shaped pressure member adapted to be clamped between the bore step and the cover.

4. Pump as claimed in claim 1, wherein the radially expandable projection of the cover along with an expanded area of a bore step of the pump housing forms a wedge-type attachment.

5. Pump as claimed in claim 1, wherein the cover is retained in the pump housing by.

6. Pump as claimed in claim 1, wherein the peripheral surface of the valve seat member has an undercut to permit the material of the pump housing to be deformed.

* * * * *